United States Patent
Zhao

(10) Patent No.: US 10,853,631 B2
(45) Date of Patent: Dec. 1, 2020

(54) FACE VERIFICATION METHOD AND APPARATUS, SERVER AND READABLE STORAGE MEDIUM

(71) Applicant: ADVANCED NEW TECHNOLOGIES CO., LTD., Grand Cayman (KY)

(72) Inventor: Hao Zhao, Hangzhou (CN)

(73) Assignee: ADVANCED NEW TECHNOLOGIES CO., LTD., Grand Cayman (KY)

(*) Notice: Subject to any disclaimer, the term of this patent is extended or adjusted under 35 U.S.C. 154(b) by 0 days.

(21) Appl. No.: 16/875,121

(22) Filed: May 15, 2020

(65) Prior Publication Data
US 2020/0279101 A1 Sep. 3, 2020

Related U.S. Application Data

(63) Continuation of application No. PCT/CN2020/071702, filed on Jan. 13, 2020.

(30) Foreign Application Priority Data

Jul. 24, 2019 (CN) .......................... 2019 1 0673271

(51) Int. Cl.
*G06K 9/00* (2006.01)
*G06T 7/11* (2017.01)
*G06F 21/32* (2013.01)

(52) U.S. Cl.
CPC ......... *G06K 9/00288* (2013.01); *G06F 21/32* (2013.01); *G06T 7/11* (2017.01); *G06T 2207/30201* (2013.01)

(58) Field of Classification Search
CPC ....... G06K 9/00288; G06F 21/32; G06T 7/11; G06T 2207/30201
See application file for complete search history.

(56) References Cited

U.S. PATENT DOCUMENTS 6,947,579 B2 9/2005 Bronstein et al.
7,551,755 B1 6/2009 Steinberg et al.
(Continued)

FOREIGN PATENT DOCUMENTS

CN 103716309 A 4/2014
CN 105912912 A 8/2016
(Continued)

OTHER PUBLICATIONS

First Search dated Apr. 25, 2020, issued in related Chinese Application No. 201910673271.6 (2 pages).
(Continued)

*Primary Examiner* — Ming Y Hon

(57) ABSTRACT

Methods, systems, and apparatus, including computer programs encoded on computer storage media, for face verification are provided. One of the methods includes: acquiring a two-dimensional face image and a three-dimensional face image for face verification of a target user; performing face recognition on the acquired two-dimensional face image with respect to the target user to obtain a result of the face recognition; in response to the result of the face recognition indicating that the face recognition is successful, performing three-dimensional reconstruction on the acquired two-dimensional face image to obtain a reconstructed three-dimensional face image; performing liveness detection on the acquired three-dimensional face image to determine whether a face in the acquired three-dimensional face image corresponds to a live person; comparing the reconstructed three-dimensional face image with the acquired three-dimensional face image to determine a similarity value; determining that the two-dimension face image corresponds to the target user.

20 Claims, 2 Drawing Sheets

(56) References Cited

U.S. PATENT DOCUMENTS

| | | |
|---|---|---|
| 7,646,909 B2 | 1/2010 | Jiang et al. |
| 7,907,774 B2 | 3/2011 | Parr et al. |
| 8,055,667 B2 | 11/2011 | Levy |
| 8,090,160 B2 | 1/2012 | Kakadiaris et al. |
| 8,199,979 B2 | 6/2012 | Steinberg et al. |
| 8,379,014 B2 | 2/2013 | Wiedemann et al. |
| 8,494,227 B2 | 7/2013 | Prokoski |
| 8,831,295 B2 | 9/2014 | Coons |
| 8,897,504 B2 | 11/2014 | Steinberg et al. |
| 9,087,232 B2 | 7/2015 | Solem et al. |
| 9,117,105 B2 | 8/2015 | Da et al. |
| 9,787,977 B2 | 10/2017 | Bernard et al. |
| 9,928,406 B2 | 3/2018 | Bhanu et al. |
| 10,331,941 B2 | 6/2019 | Rhee et al. |
| 10,444,363 B2 | 10/2019 | Russ |
| 2006/0245639 A1* | 11/2006 | Jiang .................. G06K 9/00288 382/154 |
| 2009/0132371 A1* | 5/2009 | Strietzel .................. G06T 19/20 705/14.46 |
| 2011/0075916 A1* | 3/2011 | Knothe ................ G06K 9/6247 382/154 |
| 2014/0016836 A1 | 1/2014 | Gamliel |
| 2015/0125049 A1* | 5/2015 | Taigman ............... G06T 15/205 382/118 |
| 2016/0070952 A1* | 3/2016 | Kim ................... G06K 9/00208 382/118 |
| 2017/0032601 A1* | 2/2017 | Zhou ........................ G07C 9/37 |
| 2018/0173980 A1* | 6/2018 | Fan .................... G06K 9/00906 |
| 2018/0196997 A1* | 7/2018 | Price .................. G06K 9/00281 |
| 2018/0276455 A1* | 9/2018 | An ..................... G06K 9/00288 |
| 2019/0035149 A1 | 1/2019 | Chen et al. |
| 2019/0080155 A1 | 3/2019 | Ganong et al. |
| 2019/0286885 A1* | 9/2019 | Liu ..................... G06K 9/6273 |

FOREIGN PATENT DOCUMENTS

| | | |
|---|---|---|
| CN | 107480500 A | 12/2017 |
| CN | 107563304 A | 1/2018 |
| CN | 108427871 A | 8/2018 |
| CN | 108537191 A | 9/2018 |
| CN | 109670487 A | 4/2019 |
| CN | 109978989 A | 7/2019 |

OTHER PUBLICATIONS

First Office Action dated May 6, 2020, issued in related Chinese Application No. 201910673271.6, with English machine translation (16 pages).

* cited by examiner

FACE VERIFICATION METHOD AND APPARATUS, SERVER AND READABLE STORAGE MEDIUM

CROSS-REFERENCE TO RELATED APPLICATIONS

This application is a continuation application of International Patent Application No. PCT/CN2020/071702, filed with the China National Intellectual Property Administration (CNIPA) of People's Republic of China on Jan. 13, 2020, which is based on and claims priority to and benefit of Chinese Patent Application No. 201910673271.6, filed with the CNIPA on Jul. 24, 2019. The entire contents of all of the above-identified applications are incorporated herein by reference.

TECHNICAL FIELD

The embodiments of the specification relate to the technical field of data processing, and in particular, to a face verification method and apparatus, a server, and a readable storage medium.

BACKGROUND

With the rapid development in face recognition technologies, the face recognition technologies are increasingly used in people's daily lives. The face recognition technologies are applied to scenarios such as entering a train station, making payments at a supermarket, and logging into a mobile APP by using the "face swiping" check-in services.

In current technologies, a face recognition device, such as an LOT face swiping machine, is facing face spoof attacks, namely an attack of trying to pass the face-swiping verification by using a general mask, photo, or video. To fight against such attacks, a common practice is to introduce structured-light 3D cameras. In other words, whether a user is a live person can be determined by detecting liveness in an acquired 3D image.

SUMMARY

The embodiments of the specification provide a face verification method and apparatus, a server and a readable storage medium, which can improve the accuracy of face verification and effectively enhance the performance in fighting against face spoof attacks based on the improvement of the face verification.

A first aspect of an embodiment of the specification provides a face verification method, comprising:

performing face recognition on an acquired two-dimensional face image to obtain a result of the face recognition;

if the result of the face recognition indicates that the face recognition is successful, performing three-dimensional reconstruction on the two-dimensional face image to obtain a reconstructed three-dimensional face image;

performing liveness detection on an acquired original three-dimensional face image to obtain a result of the liveness detection;

if the result of the liveness detection indicates that a user in the original three-dimensional face image is a live person, performing a similarity comparison between the reconstructed three-dimensional face image and the original three-dimensional face image to obtain a result of the comparison; and determining whether a user in the two-dimensional face image is a target user according to the result of the comparison.

A second aspect of an embodiment of the specification provides a face verification apparatus, comprising:

a face recognition unit, configured to perform face recognition on an acquired two-dimensional face image and obtain a result of the face recognition;

a three-dimensional reconstruction unit, configured to perform three-dimensional reconstruction on the two-dimensional face image if the result of the face recognition indicates that the face recognition is successful and obtain a reconstructed three-dimensional face image;

a liveness detection unit, configured to perform liveness detection on an acquired original three-dimensional face image and obtain a result of the liveness detection;

a similarity comparison unit, configured to, if the result of the liveness detection indicates that a user in the original three-dimensional face image is a live person, perform a similarity comparison between the reconstructed three-dimensional face image and the original three-dimensional face image and obtain a result of the comparison; and a face verification unit, configured to determine whether a user in the two-dimensional face image is a target user according to the result of the comparison.

A third aspect of an embodiment of the specification provides a server. The server comprises a memory, a processor, and a computer program stored in the memory and executable on the processor, wherein the processor, when executing the program, implements steps of the above-described face verification method.

A fourth aspect of an embodiment of the specification provides a computer-readable storage medium having stored thereon a computer program which, when executed by a processor, implements steps of the above-described face verification method.

According to some embodiments, a face verification method comprises acquiring a two-dimensional face image and a three-dimensional face image for face verification of a target user; performing face recognition on the acquired two-dimensional face image with respect to the target user to obtain a result of the face recognition; in response to the result of the face recognition indicating that the face recognition is successful, performing three-dimensional reconstruction on the acquired two-dimensional face image to obtain a reconstructed three-dimensional face image; performing liveness detection on the acquired three-dimensional face image to determine whether a face in the acquired three-dimensional face image corresponds to a live person; in response to determining that the face in the acquired three-dimensional face image corresponds to a live person, comparing the reconstructed three-dimensional face image with the acquired three-dimensional face image to determine a similarity value; and in response to the determined similarity value satisfying a condition, determining that the two-dimension face image corresponds to the target user.

In some embodiments, the comparing the reconstructed three-dimensional face image with the acquired three-dimensional face image to determine a similarity value comprises comparing three-dimensional structure data of the reconstructed three-dimensional face image with three-dimensional structure data of the acquired three-dimensional face image.

In some embodiments, the condition comprises that the determined similarity value is not less than a threshold similarity value.

In some embodiments, the performing face recognition on the acquired two-dimensional face image with respect to the target user to obtain a result of the face recognition comprises performing face recognition on the two-dimensional face image to obtain a face recognition value; determining whether the face recognition value is not less than a threshold value; obtaining a result indicating that the face recognition is successful if the face recognition value is not less than the threshold value; and obtaining a result indicating that the face recognition is unsuccessful if the face recognition value is less than the threshold value.

In some embodiments, the performing liveness detection on the acquired three-dimensional face image to determine whether a face in the acquired three-dimensional face image corresponds to a live person comprises performing liveness detection on the acquired three-dimensional face image to obtain a liveness detection value; determining whether the liveness detection value is less than a threshold liveness value; if the liveness detection value is not less than the threshold liveness value, determining that the face in the acquired three-dimensional face image corresponds to a live person; and if the liveness detection value is less than the threshold liveness value, determining that the face in the acquired three=dimensional face image does not correspond to a live person.

In some embodiments, the method further comprises, before performing face recognition on the acquired two-dimensional face image subtracting an average brightness value from the acquired two-dimensional face image; or performing face detection, face alignment, and image background removal on the acquired two-dimensional face image.

In some embodiments, the three-dimensional reconstruction on the acquired two-dimensional face image is based on a TensorFlow-based colored 3D reconstruction algorithm, an Im2Avatar algorithm, a 3-SWEEP algorithm, or a 3D-GAN algorithm.

According to other embodiments, a face verification system comprises a processor and a non-transitory computer-readable storage medium storing instructions executable by the processor to cause the system to perform operations. The operations comprise acquiring a two-dimensional face image and a three-dimensional face image for face verification of a target user; performing face recognition on the acquired two-dimensional face image with respect to the target user to obtain a result of the face recognition; in response to the result of the face recognition indicating that the face recognition is successful, performing three-dimensional reconstruction on the acquired two-dimensional face image to obtain a reconstructed three-dimensional face image; performing liveness detection on the acquired three-dimensional face image to determine whether a face in the acquired three-dimensional face image corresponds to a live person; in response to determining that the face in the acquired three-dimensional face image corresponds to a live person, comparing the reconstructed three-dimensional face image with the acquired three-dimensional face image to determine a similarity value; and in response to the determined similarity value satisfying a condition, determining that the two-dimension face image corresponds to the target user.

According to yet another embodiment, a non-transitory computer-readable storage medium for face verification is configured with instructions executable by one or more processors to cause the one or more processors to perform operations. The operations comprise acquiring a two-dimensional face image and a three-dimensional face image for face verification of a target user; performing face recognition on the acquired two-dimensional face image with respect to the target user to obtain a result of the face recognition; in response to the result of the face recognition indicating that the face recognition is successful, performing three-dimensional reconstruction on the acquired two-dimensional face image to obtain a reconstructed three-dimensional face image; performing liveness detection on the acquired three-dimensional face image to determine whether a face in the acquired three-dimensional face image corresponds to a live person; in response to determining that the face in the acquired three-dimensional face image corresponds to a live person, comparing the reconstructed three-dimensional face image with the acquired three-dimensional face image to determine a similarity value; and in response to the determined similarity value satisfying a condition, determining that the two-dimension face image corresponds to the target user.

The embodiments of the specification have the following beneficial effects:

Based on the above-described technical solutions, under the conditions of successful face recognition and successful liveness detection, the reconstructed three-dimensional face image and the original three-dimensional face image are subjected to the similarity comparison; and whether a user in the two-dimensional face image is a target user is determined according to the obtained result of the comparison. In this way, the two conditions: successful face recognition and successful liveness detection, are used as constraint conditions, so as to ensure the accuracy of face data that needs to be subjected to a subsequent similarity comparison; in other words, the accuracy of the reconstructed three-dimensional face image and the original three-dimensional face image will be higher; the reconstructed three-dimensional face image is used as a control sample then a similarity comparison is performed, thus accuracy of the result of the comparison can be improved; and based on the high accuracy of the result of the comparison, the accuracy of determining whether a user in the two-dimensional face image is a target user is also improved, which in turn further improves the accuracy of face verification; and based on the improvement of the face verification, performance in fighting against face spoof attacks can be effectively enhanced.

Moreover, the similarity comparison is performed on the three-dimensional face images which carry more data dimensions, and data of each dimension needs to be subjected to the similarity comparison in a similarity comparison process. Thus, the more data dimensions give rise to a higher accuracy in the comparison result obtained from the similarity comparison; and the accuracy of the result of the comparison is further improved; based on the further improvement of the accuracy of the result of the comparison, the accuracy of determining whether a user in the two-dimensional face image is a target user is further improved; in other words, the accuracy of the face verification can be further enhanced; and the performance in fighting against face spoof attacks can be further improved based on the improvement of the face verification.

DETAILED DESCRIPTION

In order to better understand the above-described technical solutions, the technical solutions of the embodiments of the specification are described in detail below in combination with the accompanying drawings and specific embodiments. It should be understood that the embodiments of the specification and specific features in the embodiments are detailed descriptions of the technical solutions of the embodiments of the specification, rather than limiting the technical solutions of the specification. The embodiments of the specification and the technical characteristics of the embodiments can be mutually combined without conflicts.

Figure 1:
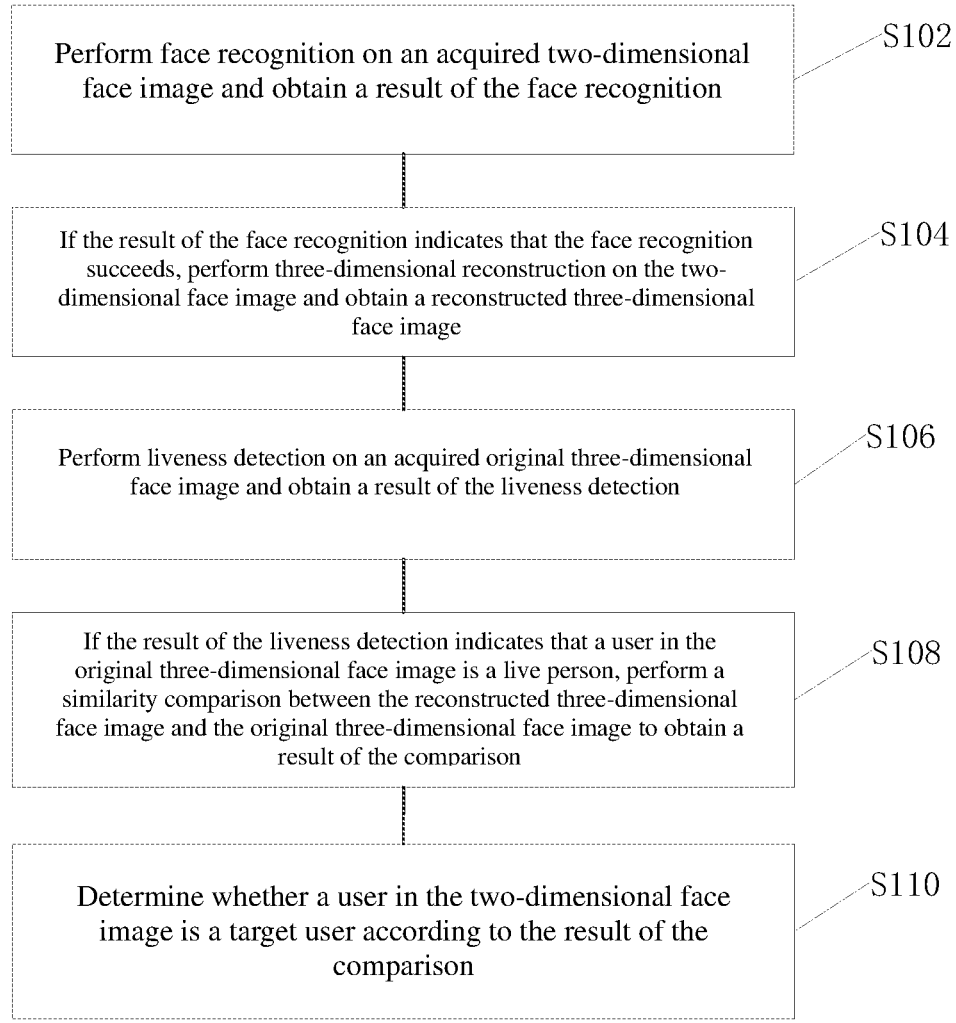
FIG. 1 shows a flow chart of a face verification method according to an embodiment of the specification.

According to a first aspect, as shown in FIG. 1, an embodiment of the specification provides a face verification method, comprising:

S102, performing face recognition on an acquired two-dimensional face image to obtain a result of the face recognition; the face recognition may be performed with respect to a target user to determine whether a face in the two-dimensional face image matches a face of the target user;

S104, if the result of the face recognition indicates that the face recognition is successful, performing three-dimensional reconstruction on the two-dimensional face image to obtain a reconstructed three-dimensional face image;

S106, performing liveness detection on an acquired original three-dimensional face image to obtain a result of the liveness detection;

S108, if the result of the liveness detection indicates that a user in the original three-dimensional face image is a living body, a live person, or a live subject (e.g., rather than a fake object), performing a similarity comparison between the reconstructed three-dimensional face image and the original three-dimensional face image to obtain a result of the comparison; and S110, determining whether a user in the two-dimensional face image is a target user according to the result of the comparison.

Here, in the step S102, the image acquisition may be performed by a two-dimensional photographing device so as to acquire the two-dimensional face image; and the face recognition is then performed on the two-dimensional face image to obtain the result of the face recognition according to a face recognition algorithm, wherein the photographing device may be a camera, a pan-and-tilt camera, a video camera, a digital camera, or the like.

For example, after the two-dimensional face image is obtained, the face recognition may be performed on the two-dimensional face image to obtain a face recognition value; whether the face recognition value is not less than a set face threshold value is determined and a result of the face determination is obtained; and the result of the face recognition is determined according to the result of the face determination. Determining the result of face recognition includes obtaining a result indicating that the face recognition is successful if the face recognition value is not less than the threshold value; and obtaining a result indicating that the face recognition is unsuccessful if the face recognition value is less than the threshold value.

In the embodiment of the specification, in the face recognition process performed on the two-dimensional face image, the two-dimensional face image may be preprocessed at first to obtain the preprocessed two-dimensional face image; and then the face recognition algorithm is used for performing face recognition on the preprocessed two-dimensional face image to obtain the result of the face recognition.

In the embodiment of the specification, the set face threshold value may be set according to an actual condition, or may be set manually or set by a device; and the set face threshold value may be a value not less than 80% but less than 1, for example, 80%, 85%, or 90%. Naturally, the set face threshold value may also be set as a value less than 80%, which is not limited by the specification.

In the embodiment of the specification, the face recognition algorithm includes feature-based recognition algorithms, appearance-based recognition algorithms, template-based recognition algorithms, recognition algorithms using a neural network, recognition algorithms using a support vector machine, and the like, which are not limited by the specification.

For example, by preprocessing the two-dimensional face image, an average brightness value of the two-dimensional face image can be removed, thus influences of illumination on the face recognition algorithm can be reduced, and accuracy of face recognition in the preprocessed two-dimensional face image by using the face recognition algorithm can be improved.

In the embodiment of the specification, when the two-dimensional face image is preprocessed, since the two-dimensional face image is an original image, the two-dimensional face image thus includes a face area, a background, and noise. Therefore, the two-dimensional face image may firstly be subjected to face detection, face alignment, and image background removal in sequence to obtain a processed face image; the impact of the background and noise data in the two-dimensional face image on the recognition algorithm is thus lowered, thereby improving the accuracy of face recognition in the preprocessed two-dimensional face image.

Furthermore, after the two-dimensional face image is obtained, a mean pixel value corresponding to the processed face image may be determined according to all pixel values in the processed face image; a variance corresponding to each pixel in the processed face image may be determined according to the mean pixel value; each pixel may be normalized by using the mean pixel value and the variance corresponding to each pixel, so as to obtain normalization data of each pixel; and the preprocessed two-dimensional face image may be obtained according to the normalization data of each pixel.

Naturally, when the preprocessed two-dimensional face image is to be obtained, the two-dimensional face image may be processed by using one or more of the above-described means, and thus the preprocessed two-dimensional face image is obtained.

For example, when the two-dimensional face image is preprocessed, a mean value and a variance are computed for the processed face image. The mean value m is computed for all pixels in the processed face image; the variance s corresponding to each pixel in the processed face image is computed based on the computed mean value m; and normalization of the mean value and the variance is performed for each pixel in the processed face image to obtain normalization data of each pixel. Through the normalization, an average brightness value in the two-dimensional face image can be removed, the impact of illumination on the algorithm can be reduced, and accuracy of face recognition computation for the preprocessed two-dimensional face image by the algorithm can be improved.

In the embodiment of the specification, after the two-dimensional face image is subjected to face recognition and the face recognition value is obtained, whether the face recognition value is not less than a set face threshold value is determined; if the obtained result of the face determination indicates that the face recognition value is not less than the set face threshold value, it is determined that the result of the face recognition is that the face recognition is successful; in other words, a user in the two-dimensional face image can be recognized, and then the method proceeds to the step S104; and if the obtained result of the face determination indicates that the face recognition value is less than the set face threshold value, it is determined that the result of the face recognition is that the face recognition fails; in other words, a user in the two-dimensional face image cannot be recognized; and then no other operations are performed.

A two-dimensional face image a1 is used herein as an example; if the probability of a user being all in a1 is 85% computed through a face recognition algorism, and the set face threshold value is 90%, since in this case 85% is less than 90%, the face recognition algorithm fails to recognize all; in other words, it is determined that a result of the face recognition of a1 is that the face recognition fails; and no other operations are performed.

In another example, a two-dimensional face image a2 is used for illustration. If the probability of a user being a21 in a2 is 95% computed through a face recognition algorithm, and the set face threshold value is 90%, since in this case 95% is greater than 90%, the face recognition algorithm would be able to recognize a21; in other words, it is determined that a result of the face recognition of a2 is that the face recognition is successful; and then the step proceeds to the step S104.

If the result of the face recognition indicates that the face recognition is successful, proceed to the step S104. In this step, three-dimensional reconstruction may be performed on the face image by using a three-dimensional reconstruction algorithm, and the reconstructed three-dimensional face image is obtained.

In the embodiment of the specification, the three-dimensional reconstruction algorithm includes TensorFlow-based colorful 3D reconstruction (Im2Avatar) algorithms for single images, 3-SWEEP algorithms, and 3D-GAN algorithms and the like, which are not limited by the specification.

For example, when an Im2Avatar algorithm is used for three-dimensional reconstruction, the two-dimensional face image may be coded and decoded; and then coded and decoded data is subjected to shape learning, surface color learning, and detail construction; and finally, data obtained from the learning and the detail construction are combined to obtain the reconstructed three-dimensional face data.

Next, proceed to the step S106. In this step, a three-dimensional imaging device may be used for image acquisition to obtain the original three-dimensional face image; and the original three-dimensional face image is subjected to liveness detection and the result of the liveness detection is obtained; the three-dimensional imaging device may be a 3D camera or a 3D video camera.

In the embodiment of the specification, the step S106 may be implemented simultaneously with the step S102, or may be implemented before or after the step S102. Furthermore, the two-dimensional imaging device and the three-dimensional imaging device may be disposed on the same LOT device, or on two connected LOT devices, which are not limited by the specification.

In the embodiment of the specification, during the process of implementing the step S102 and the step S106, the two-dimensional face image and the original three-dimensional face image may be acquired at a set time and in a set area. For example, a two-dimensional face image and a three-dimensional face image in a set area may be acquired in real time through a 2D camera and a 3D camera on a face swiping device disposed at an exit of a store. The set area may be configured according to actual situations, or may be set by a device or manually. Similarly, the set time may be configured according to actual situations, or may be set by a device or manually. The set time may be set as, for example, 1s, 2s, or 4s, which is not limited by the specification.

In the embodiment of the specification, when face recognition is performed on the original three-dimensional face image, the original three-dimensional face image may be preprocessed at first to obtain the preprocessed three-dimensional face image; and then the preprocessed three-dimensional face image is subjected to liveness detection by using a liveness detection algorithm, so as to obtain the result of the liveness detection.

For example, for an implementation process of preprocessing the original three-dimensional face image, reference may be made to the description about preprocessing the two-dimensional face image in the step S102, which will be not elaborated herein for the reason of conciseness of the specification.

In the embodiment of the specification, during the liveness detection process, the liveness detection may be performed on the original three-dimensional face image to obtain a liveness detection value; whether the liveness detection value is less than a set liveness value is detected to obtain a result of the detection; and the result of the liveness detection is determined according to the result of the detection; when the liveness detection is performed on the original three-dimensional face image, the liveness detection algorithm may be used to perform the liveness detection on the original three-dimensional face image.

For example, if the result of the detection indicates that the liveness detection value is less than the set live person threshold value, it is determined that the result of the liveness detection is that a user in the original three-dimensional face image is a live person; and if the result of the detection indicates that the liveness detection value is not less than the set live person threshold value, it is determined that the result of the liveness detection is that a user in the original three-dimensional face image is a non-live person.

In the embodiment of the specification, if the result of the liveness detection indicates that a user in the original three-dimensional face image is a live person, proceed to the step S108; and if the result of the liveness detection indicates that a user in the original three-dimensional face image is a non-live person, no further operations are performed for this face recognition.

In the embodiment of the specification, there may be one or a plurality of original three-dimensional face images, and the number of the original three-dimensional face images is matched with that of images required by the liveness detection algorithm. In other words, the number of the original three-dimensional face images is not less than that of the images required by the liveness detection algorithm. For example, if the liveness detection algorithm requires two images, the number of the original three-dimensional face images will be not less than two.

In the embodiment of the specification, the set live person threshold value may be configured according to actual situations, or may be set manually or by a device. The set live person threshold value may be a value not less than 80% but less than 1, for example, 80%, 85%, or 90%. Naturally, the set live person threshold value may also be set as a value less than 80%, which is not limited by the specification.

In the embodiment of the specification, the liveness detection algorithm may be, for example, an anti-spoofing algorithm, an image distortion analysis algorithm, a color texture algorithm, or the like.

For example, if the set live person threshold value is represented by T, a liveness detection value obtained by performing liveness detection on the original three-dimensional face image is represented by S. It is detected to see if S is less than T; if S is less than T, it is determined that a user in the original three-dimensional face image is a live person, and then proceed to the step S108; and if S is not less than T, it is determined that a user in the original three-dimensional face image is a non-live person, and no further operations are performed for this face recognition.

If the result of the liveness detection indicates that a user in the original three-dimensional face image is a live person, proceed to the step S108; and the reconstructed three-dimensional face image and the original three-dimensional face image may be directly compared in whole to obtain the result of the comparison; and a similarity comparison between reconstructed three-dimensional structure data of the reconstructed three-dimensional face image and original three-dimensional structure data of the original three-dimensional face image may be performed and the result of the comparison is obtained.

In this case, since the three-dimensional structure data carries more data dimensions and data of each dimension needs to be subjected to the similarity comparison, based on more data dimensions, the accuracy of the result of the comparison obtained from the similarity comparison is higher when a similarity comparison is performed between the reconstructed three-dimensional structure data and the original three-dimensional structure data.

For example, when the reconstructed three-dimensional face image and the original three-dimensional face image are compared in whole, the reconstructed three-dimensional face image and the original three-dimensional face image may be inputted into a similarity algorithm to perform similarity computation, so as to obtain an image similarity; whether the image similarity is not less than a set similarity is determined to obtain a result of the similarity determination; and the result of the comparison is determined according to the result of the similarity determination. Here, the image similarity may be quantified by a similarity value. The reconstructed three-dimensional face image and the original three-dimensional face image may be inputted into a similarity algorithm to perform similarity computation, so as to obtain the similarity value. It may be determined whether the similarity value satisfies a condition. For example, it may be determined whether the obtained similarity value is not less than a threshold similarity value. If the similarity value satisfies the condition, it may be determined that the two dimensional image corresponds to the target user.

Similarly, during the similarity comparison between the reconstructed three-dimensional structure data and the original three-dimensional structure data, the reconstructed three-dimensional structure data and the original three-dimensional structure data may be inputted into the similarity algorithm to perform similarity computation, so as to obtain an image similarity; whether the image similarity is not less than a set similarity is determined to obtain a result of the similarity determination; and the result of the comparison is determined according to the result of the similarity determination.

For example, if the result of the similarity determination indicates that the image similarity is not less than the set similarity, it is determined that the result of the comparison indicates a successful comparison; and if the result of the similarity determination indicates that the image similarity is less than the set similarity, it is determined that the result of the comparison indicates a failed comparison.

In the embodiment of the specification, the similarity algorithm may be a cosine algorithm, a Euclidean distance algorithm, a perceptual hash algorithm, or the like. Furthermore, the set similarity may be set according to actual situations, or may be set manually or by a device. The set similarity may be a value not less than 75% but less than 1, for example, 75%, 80%, or 90%. Naturally, the set similarity may also be set as a value less than 75%, which is not limited by the specification.

Next, proceed to the step S110. If the result of the comparison indicates that the comparison is successful, it is determined that a user in the two-dimensional face image is a target user; and if the result of the comparison indicates that the comparison fails, it is determined that a user in the two-dimensional face image is not a target user.

In the embodiment of the specification, the overall process of the face verification method is as follows: firstly, implement S1: obtaining a face image through a 2D imaging device, and performing face recognition: if the face recognition is successful, proceed to step S2: which is performing 3D reconstruction on the face image through a deep learning algorithm such as Im2Avatar to obtain a reconstructed 3D face image; and if the face recognition fails, proceed to step S3, which is if the face verification process fails, do not perform any operations for this face recognition; when implementing the step S1, step S4 may be implemented at the same time: acquiring an original 3D face image through a 3D imaging device, and performing liveness detection to determine whether a user in the 3D face image is a live person; if not, proceed to the step S3; and if so, proceed to step S5, which is performing a similarity comparison between the reconstructed 3D face image and the original 3D face image; if the comparison is successful, proceed to step S6: determining that a user in the face image is a target user, which means that the face verification is successful; and if the comparison fails, proceed to step S7: determining that a user in the face image is not a target user, which means that the face verification fails.

For example, taking an acquired original three-dimensional face image being a3 as an example, and a3 is subjected to liveness detection to obtain a liveness detection value S, and S is less than T (the set liveness value); then it is determined that a user in a3 is a live person; and then, original three-dimensional structure data of a3 is obtained and represented by a3-1. Correspondingly, taking the two-dimensional face image being a2 as an example; a face recognition value corresponding to a2 is 95%, and the set face threshold value is 90%; in this case, since 95% is greater than 90%, a2 is subjected to three-dimensional reconstruction to obtain a reconstructed three-dimensional face image a22, and reconstructed three-dimensional structural data of a22 is obtained and represented by a22-1. If a perceptual hash algorithm is used for similarity computation, an average hash algorithm is used to perform hash computation on a3-1 and a22-1 respectively, so as to obtain hash values a3-2 and a22-2 respectively; a similarity between a3-2 and a22-2 is computed and represented by S1;

whether S1 is greater than the set similarity S2 is determined; if S1 is not less than S2, it is determined that the result of the comparison indicates that the comparison is successful, and then it can be determined that a21 in a2 is a target user; If S1 is less than S2, it is determined that the result of the comparison indicates that the comparison fails, and then it can be determined that a21 in a2 is not a target user.

In current technologies, in order to improve the performance in fighting against face spoof attacks, a 3D camera is usually used for defense. In other words, whether a user is a live person can be determined by performing live-body detection on an acquired 3D image. Face recognition is performed by determining whether the user is a live person. However, there is no control sample in a face verification process, which leads to a less accurate face verification.

In the embodiment of the specification, under the conditions of successful face recognition and successful liveness detection, the reconstructed three-dimensional face image and the original three-dimensional face image are then subjected to similarity comparison; and whether a user in the two-dimensional face image is a target user is determined according to the obtained result of the comparison. Thus, by taking the successful face recognition and the successful liveness detection as constraint conditions, the accuracy of face data that needs to be subjected to a subsequent similarity comparison is ensured; in other words, accuracy of the reconstructed three-dimensional face image and the original three-dimensional face image would be higher; the reconstructed three-dimensional face image is used as a control sample then a similarity comparison is performed, thus accuracy of the result of the comparison can be improved; and based on the high accuracy of the result of the comparison, the accuracy of determining whether a user in the two-dimensional face image is a target user is also improved, which in turn further improves the accuracy of face verification; and based on the improvement of the face verification, performance in fighting against face spoof attacks can be effectively enhanced.

Moreover, the similarity comparison is performed on the three-dimensional face images which carry more data dimensions, and data of each dimension needs to be subjected to the similarity comparison in a similarity comparison process. Thus, the more data dimensions give rise to a higher accuracy in the comparison result obtained from the similarity comparison; and the accuracy of the result of the comparison is further improved; based on the further improvement of the accuracy of the result of the comparison, the accuracy of determining whether a user in the two-dimensional face image is a target user is further improved; in other words, the accuracy of the face verification can be further enhanced; and the performance in fighting against face spoof attacks can be further improved based on the improvement of the face verification.

Figure 2:
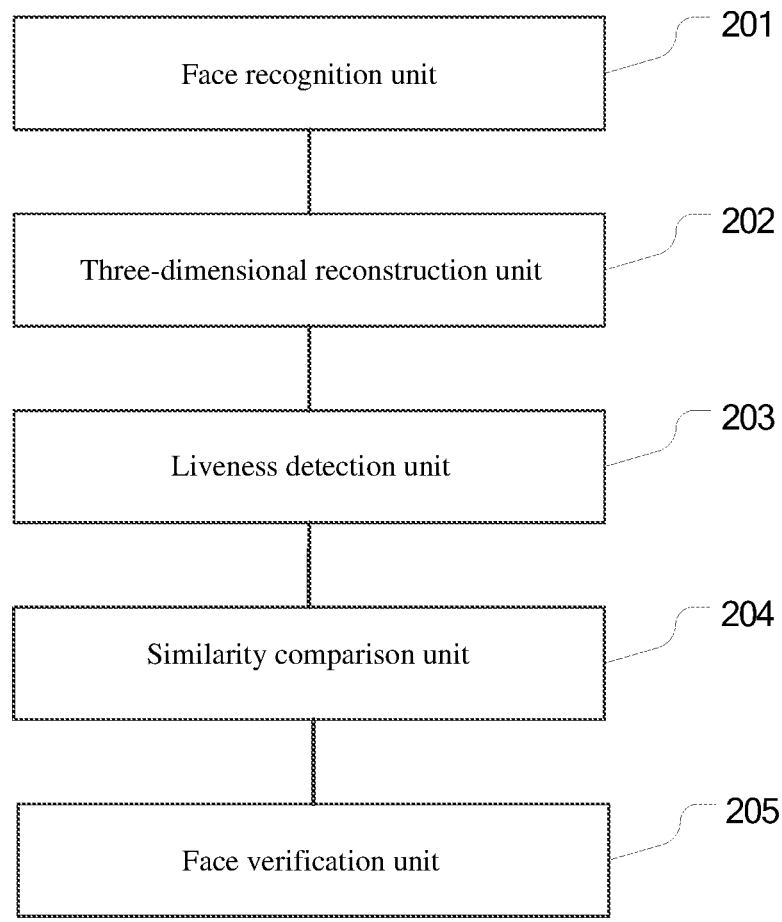
FIG. 2 shows a structural schematic diagram of a face verification apparatus according to an embodiment of the specification.

According to a second aspect, based on the same inventive concept of the first aspect, an embodiment of the specification provides a face verification apparatus, as shown in FIG. 2, comprising:

a face recognition unit 201, configured to perform face recognition on an acquired two-dimensional face image and obtain a result of the face recognition;

a three-dimensional reconstruction unit 202, configured to perform three-dimensional reconstruction on the two-dimensional face image to obtain a reconstructed three-dimensional face image if the result of the face recognition indicates that the face recognition is successful;

a liveness detection unit 203, configured to perform liveness detection on an acquired original three-dimensional face image and obtain a result of the liveness detection;

a similarity comparison unit 204, configured to, if the result of the liveness detection indicates that a user in the original three-dimensional face image is a live person, perform a similarity comparison between the reconstructed three-dimensional face image and the original three-dimensional face image and obtain a result of the comparison; and a face verification unit 205, configured to determine whether a user in the two-dimensional face image is a target user according to the result of the comparison.

In an optional manner, the similarity comparison unit 204 is configured to perform a similarity comparison between reconstructed three-dimensional structure data of the reconstructed three-dimensional face image and original three-dimensional structure data of the original three-dimensional face image and obtain the result of the comparison.

In an optional manner, the similarity comparison unit 204 is configured to input the reconstructed three-dimensional structure data and the original three-dimensional structure data into a similarity algorithm to perform similarity computation, so as to obtain an image similarity; determine whether the image similarity is not less than a set similarity, so as to obtain a result of the similarity determination; and determine the result of the comparison according to the result of the similarity determination.

In an optional manner, the similarity comparison unit 204 is configured to determine that the result of the comparison indicates a successful comparison if the result of the similarity determination indicates that the image similarity is not less than the set similarity; and determine that the result of the comparison indicates a failed comparison if the result of the similarity determination indicates that the image similarity is less than the set similarity.

In an optional manner, the face recognition unit 201 is configured to perform face recognition on the two-dimensional face image to obtain a face recognition value; determine whether the face recognition value is not less than a set face threshold value, so as to obtain a result of the face determination; and determine the result of the face recognition according to the result of the face determination.

In an optional manner, the liveness detection unit 203 is configured to perform image acquisition through a three-dimensional imaging device to obtain the original three-dimensional face image; and perform liveness detection on the original three-dimensional face image and obtain the result of the liveness detection;

In an optional manner, the liveness detection unit 203 is configured to perform liveness detection on the original three-dimensional face image to obtain a liveness detection value; detect whether the liveness detection value is less than a set liveness value, so as to obtain a result of the detection; and determine the result of the liveness detection according to the result of the detection.

According to a third aspect, based on the same inventive concept of the face verification method in the above-described embodiment, an embodiment of the specification provides a server. As show in FIG. 3, the server comprises a memory 304, a processor 302, and a computer program stored in the memory 304 and executable on the processor 302, wherein the processor 302, when executing the program, implements steps of any above-described face verification method.

Figure 3:
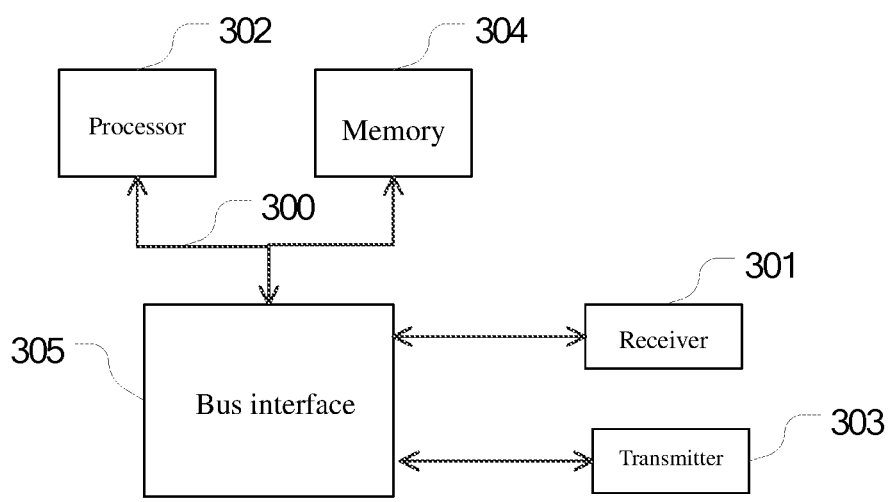
FIG. 3 shows a structural schematic diagram of a server according to an embodiment of the specification.

Here, in FIG. 3, a bus architecture is represented by a bus 300. The bus 300 may comprise any number of interconnected buses and bridges, and link together various circuits of one or more processors represented by the processor 302 and a memory represented by the memory 304. The bus 300 may further link together various other circuits such as a peripheral device circuit, a voltage stabilizer circuit, and a power management circuit, which are commonly known in the art and are not described further herein. A bus interface 305 provides an interface among the bus 300, a receiver 301 and a transmitter 303. The receiver 301 and the transmitter 303 may be the same element, namely a transceiver, to act as a unit for communicating with various other apparatuses on a transmission medium. The processor 302 is responsible for managing the bus 300 and general processing, and the memory 304 may be used to store data used by the processor 302 when performing operations.

According to a fifth aspect, based on the same inventive concept of the face verification method in the above-described embodiment, an embodiment of the specification provides a computer-readable storage medium having stored thereon a computer program which, when executed by a processor, implements steps of any above-described face verification method.

The embodiments are described with reference to the flow charts and/or block diagrams of the method, device (system), and computer program product. It should be understood that each flow and/or block in the flow charts and/or the block diagrams, and a combination of the flows and/or the blocks in the flow charts and/or the block diagrams can be implemented via computer program instructions. The computer program instructions may also be loaded onto a general-purpose computer, a specialized computer, an embedded processor, or the processors of other programmable data processing devices to produce a computer such that the instructions which are executed on the computer or other processors of the programmable apparatus generate a device for implementing the functions specified in one or more flows in a flow chart and/or one or more blocks in a block diagram.

The computer program instructions can also be stored in a computer readable memory which can boot a computer or other programmable data processing devices to operate in a specific manner, such that the instructions stored in the computer readable memory generate a product comprising an instruction apparatus, wherein the instruction apparatus is configured to realize the functions specified in one or more flows in a flow chart and/or one or more blocks in a block diagram.

The computer program instructions can also be loaded to a computer or other programmable data processing devices, so as to execute a series of operation steps on the computer or the other programmable devices to generate a computer reliable process, such that the instructions executed on the computer or the other programmable devices can provide steps for implementing the functions specified in one or more flows in a flow chart and/or one or more blocks in a block diagram.

When the functions disclosed herein are implemented in the form of software functional units and sold or used as independent products, they can be stored in a processor executable non-volatile computer readable storage medium. Particular technical solutions disclosed herein (in whole or in part) or aspects that contributes to current technologies may be embodied in the form of a software product. The software product may be stored in a storage medium, comprising a number of instructions to cause a computing device (which may be a personal computer, a server, a network device, and the like) to execute all or some steps of the methods of the embodiments. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Although preferred embodiments of the specification have been described, those skilled in the art may make other changes and modifications to these embodiments once they know a basic inventive concept. Therefore, the attached claims are intended to be interpreted to include the preferred embodiments, and all changes and modifications which fall within the scope of the specification.

Those skilled in the art may make various modifications and variations to the specification without departing from the spirit and scope of the specification. In this way, if these modifications and variations of the specification fall within the scope of the claims of the specification and their equivalent technologies, the specification is also intended to include these modifications and variations.

The invention claimed is:

1. A face verification method, comprising:
   acquiring a two-dimensional face image and a three-dimensional face image for face verification of a target user;
   performing face recognition on the acquired two-dimensional face image with respect to the target user to obtain a result of the face recognition;
   in response to the result of the face recognition indicating that the face recognition is successful, performing three-dimensional reconstruction on the acquired two-dimensional face image to obtain a reconstructed three-dimensional face image;
   performing liveness detection on the acquired three-dimensional face image to determine whether a face in the acquired three-dimensional face image corresponds to a live person;
   in response to determining that the face in the acquired three-dimensional face image corresponds to a live person, comparing the reconstructed three-dimensional face image with the acquired three-dimensional face image to determine a similarity value; and
   in response to the determined similarity value satisfying a condition, determining that the two-dimensional face image corresponds to the target user.

2. The method of claim 1, wherein the comparing the reconstructed three-dimensional face image with the acquired three-dimensional face image to determine a similarity value comprises:
   comparing three-dimensional structure data of the reconstructed three-dimensional face image with three-dimensional structure data of the acquired three-dimensional face image.

3. The method of claim 1, wherein the condition comprises:
   that the determined similarity value is not less than a threshold similarity value.

4. The method of claim 1, wherein the performing face recognition on the acquired two-dimensional face image with respect to the target user to obtain a result of the face recognition comprises:
performing face recognition on the two-dimensional face image to obtain a face recognition value;
determining whether the face recognition value is not less than a threshold value;
obtaining a result indicating that the face recognition is successful if the face recognition value is not less than the threshold value; and
obtaining a result indicating that the face recognition is unsuccessful if the face recognition value is less than the threshold value.

5. The method of claim 1, wherein the performing liveness detection on the acquired three-dimensional face image to determine whether a face in the acquired three-dimensional face image corresponds to a live person comprises:
performing liveness detection on the acquired three-dimensional face image to obtain a liveness detection value;
determining whether the liveness detection value is less than a threshold liveness value;
if the liveness detection value is not less than the threshold liveness value, determining that the face in the acquired three-dimensional face image corresponds to a live person; and
if the liveness detection value is less than the threshold liveness value, determining that the face in the acquired three-dimensional face image does not correspond to a live person.

6. The method of claim 1, further comprising, before performing face recognition on the acquired two-dimensional face image:
subtracting an average brightness value from the acquired two-dimensional face image; or
performing face detection, face alignment, and image background removal on the acquired two-dimensional face image.

7. The method of claim 1, wherein the three-dimensional reconstruction on the acquired two-dimensional face image is based on a TensorFlow-based colored 3D reconstruction algorithm, an Im2Avatar algorithm, a 3-SWEEP algorithm, or a 3D-GAN algorithm.

8. A face verification system, comprising a processor and a non-transitory computer-readable storage medium storing instructions executable by the processor to cause the system to perform operations comprising:
acquiring a two-dimensional face image and a three-dimensional face image for face verification of a target user;
performing face recognition on the acquired two-dimensional face image with respect to the target user to obtain a result of the face recognition;
in response to the result of the face recognition indicating that the face recognition is successful, performing three-dimensional reconstruction on the acquired two-dimensional face image to obtain a reconstructed three-dimensional face image;
performing liveness detection on the acquired three-dimensional face image to determine whether a face in the acquired three-dimensional face image corresponds to a live person;
in response to determining that the face in the acquired three-dimensional face image corresponds to a live person, comparing the reconstructed three-dimensional face image with the acquired three-dimensional face image to determine a similarity value; and
in response to the determined similarity value satisfying a condition, determining that the two-dimensional face image corresponds to the target user.

9. The system of claim 8, wherein the comparing the reconstructed three-dimensional face image with the acquired three-dimensional face image to determine a similarity value comprises:
comparing three-dimensional structure data of the reconstructed three-dimensional face image with three-dimensional structure data of the acquired three-dimensional face image.

10. The system of claim 8, wherein the condition comprises:
that the determined similarity value is not less than a threshold similarity value.

11. The system of claim 8, wherein the performing face recognition on the acquired two-dimensional face image with respect to the target user to obtain a result of the face recognition comprises:
performing face recognition on the two-dimensional face image to obtain a face recognition value;
determining whether the face recognition value is not less than a threshold value;
obtaining a result indicating that the face recognition is successful if the face recognition value is not less than the threshold value; and
obtaining a result indicating that the face recognition is unsuccessful if the face recognition value is less than the threshold value.

12. The system of claim 8, wherein the performing liveness detection on the acquired three-dimensional face image to determine whether a face in the acquired three-dimensional face image corresponds to a live person comprises:
performing liveness detection on the acquired three-dimensional face image to obtain a liveness detection value;
determining whether the liveness detection value is less than a threshold liveness value;
if the liveness detection value is not less than the threshold liveness value, determining that the face in the acquired three-dimensional face image corresponds to a live person; and
if the liveness detection value is less than the threshold liveness value, determining that the face in the acquired three-dimensional face image does not correspond to a live person.

13. The system of claim 8, wherein the operations further comprise, before performing face recognition on the acquired two-dimensional face image:
subtracting an average brightness value from the acquired two-dimensional face image; or
performing face detection, face alignment, and image background removal on the acquired two-dimensional face image.

14. The system of claim 8, wherein the three-dimensional reconstruction on the acquired two-dimensional face image is based on a TensorFlow-based colored 3D reconstruction algorithm, an Im2Avatar algorithm, a 3-SWEEP algorithm, or a 3D-GAN algorithm.

15. A non-transitory computer-readable storage medium for face verification, configured with instructions executable by one or more processors to cause the one or more processors to perform operations comprising:

acquiring a two-dimensional face image and a three-dimensional face image for face verification of a target user;

performing face recognition on the acquired two-dimensional face image with respect to the target user to obtain a result of the face recognition;

in response to the result of the face recognition indicating that the face recognition is successful, performing three-dimensional reconstruction on the acquired two-dimensional face image to obtain a reconstructed three-dimensional face image;

performing liveness detection on the acquired three-dimensional face image to determine whether a face in the acquired three-dimensional face image corresponds to a live person;

in response to determining that the face in the acquired three-dimensional face image corresponds to a live person, comparing the reconstructed three-dimensional face image with the acquired three-dimensional face image to determine a similarity value; and in response to the determined similarity value satisfying a condition, determining that the two-dimensional face image corresponds to the target user.

16. The non-transitory computer-readable storage medium of claim 15, wherein the comparing the reconstructed three-dimensional face image with the acquired three-dimensional face image to determine a similarity value comprises:

comparing three-dimensional structure data of the reconstructed three-dimensional face image with three-dimensional structure data of the acquired three-dimensional face image.

17. The non-transitory computer-readable storage medium of claim 15, wherein the condition comprises:

that the determined similarity value is not less than a threshold similarity value.

18. The non-transitory computer-readable storage medium of claim 15, wherein the performing face recognition on the acquired two-dimensional face image with respect to the target user to obtain a result of the face recognition comprises:

performing face recognition on the two-dimensional face image to obtain a face recognition value;

determining whether the face recognition value is not less than a threshold value;

obtaining a result indicating that the face recognition is successful if the face recognition value is not less than the threshold value; and obtaining a result indicating that the face recognition is unsuccessful if the face recognition value is less than the threshold value.

19. The non-transitory computer-readable storage medium of claim 15, wherein the performing liveness detection on the acquired three-dimensional face image to determine whether a face in the acquired three-dimensional face image corresponds to a live person comprises:

performing liveness detection on the acquired three-dimensional face image to obtain a liveness detection value;

determining whether the liveness detection value is less than a threshold liveness value;

if the liveness detection value is not less than the threshold liveness value, determining that the face in the acquired three-dimensional face image corresponds to a live person; and if the liveness detection value is less than the threshold liveness value, determining that the face in the acquired three-dimensional face image does not correspond to a live person.

20. The non-transitory computer-readable storage medium of claim 15, wherein the operations further comprise, before performing face recognition on the acquired two-dimensional face image:

subtracting an average brightness value from the acquired two-dimensional face image; or performing face detection, face alignment, and image background removal on the acquired two-dimensional face image.

* * * * *